(12) United States Patent
Mok et al.

(10) Patent No.: US 9,153,987 B2
(45) Date of Patent: Oct. 6, 2015

(54) BATTERY CHARGER VOLTAGE CONTROL METHOD FOR INSTANT BOOT-UP

(75) Inventors: Ken Mok, Kowloon (HK); David Dearn, Malmesburym (GB)

(73) Assignee: Micrel, Inc., San Jose, CA (US)

( * ) Notice: Subject to any disclaimer, the term of this patent is extended or adjusted under 35 U.S.C. 154(b) by 789 days.

(21) Appl. No.: 13/414,538

(22) Filed: Mar. 7, 2012

(65) Prior Publication Data

US 2013/0234677 A1  Sep. 12, 2013

(51) Int. Cl.
*H02J 7/06* (2006.01)
*H02J 7/00* (2006.01)

(52) U.S. Cl.
CPC ............. *H02J 7/0052* (2013.01); *H02J 7/0055* (2013.01); *H02J 7/0068* (2013.01); *H02J 2007/0062* (2013.01)

(58) Field of Classification Search
CPC ........................................... H02J 7/0054
USPC ............................ 320/132; 307/44–46, 64–66
See application file for complete search history.

(56) References Cited

U.S. PATENT DOCUMENTS

| | | | |
|---|---|---|---|
| 6,459,175 B1* | 10/2002 | Potega | 307/149 |
| 2004/0124817 A1* | 7/2004 | Katayama | 323/282 |
| 2004/0164708 A1* | 8/2004 | Veselic et al. | 320/132 |
| 2006/0125446 A1* | 6/2006 | Tupman et al. | 320/132 |
| 2008/0238369 A1* | 10/2008 | Cintra et al. | 320/128 |
| 2008/0290855 A1* | 11/2008 | Fishman | 323/318 |

* cited by examiner

*Primary Examiner* — Drew A Dunn
*Assistant Examiner* — Zixuan Zhou
(74) *Attorney, Agent, or Firm* — Van Pelt, Yi & James LLP

(57) ABSTRACT

A battery charger voltage control method dynamically adjusts the system voltage generated by a battery charger circuit based on the operating conditions to ensure that sufficient power is supplied to power up the circuitry of the electronic device when the battery charger circuit is connected to a current-limited power source and the battery of the electronic device is deeply depleted or is missing. In embodiments of the present invention, the battery charger voltage control method sets the system voltage to an elevated voltage value to maximize the energy transfer from the power source to the circuitry of the electronic device. In this manner, the battery charger voltage control method enables a near instant boot-up of the electronic device, even under the operating conditions where the battery of the electronic device is deeply depleted or missing and the switching battery charger circuit can only receive power from a current-limited power source.

12 Claims, 3 Drawing Sheets

BATTERY CHARGER VOLTAGE CONTROL METHOD FOR INSTANT BOOT-UP

FIELD OF THE INVENTION

The invention relates to switching battery charger circuits and, in particular, to a switching battery charger circuit enabling near instant boot-up of battery powered devices.

DESCRIPTION OF THE RELATED ART

Mobile devices, such as smartphones, are typically battery-powered devices where the battery can be recharged through an unlimited power source, such as through an AC adaptor to an electrical outlet, or recharged through a current limited power source, such as through a Universal Serial Bus (USB) port connected to a power bus. In the case of recharging from a current limited power source, the mobile devices may be recharged by connecting to a USB hub or host, such as a personal computer, through a USB cable.

Typically, a battery-operated mobile device, also referred herein as a "USB peripheral device" or a "USB device," includes a battery charger circuit which receives input power from an upstream USB power source and generates an output voltage for powering the internal circuitry of the mobile device and for charging the battery.

A rechargeable battery, such as a Li-ion rechargeable battery, typically has a voltage of 3.5 to 4.2V when fully charged. A battery having a voltage of 3.0V or below is considered to be deeply depleted. The battery charger circuit of a mobile device is typically configured to regulate it output voltage (the system voltage) to be slightly above the battery voltage, such as 3.7V. However, in cases where the battery of a mobile device is deeply depleted, such as at 2.0V, or where the battery is missing entirely, the charger circuit may end up regulating the system voltage to a voltage value too low to power up the circuitry of the mobile device. To overcome this issue, some battery charger circuits impose a minimum voltage value on the system voltage. Thus, regardless of what the battery voltage is, the battery charger circuit will regulate to a voltage slightly above the battery voltage or to a minimum system voltage, such as 3.3V.

When a mobile device is connected to an unlimited power source, such as through the AC adaptor, recharging of a deeply depleted battery while powering up of the mobile device does not present any obstacles. However, when the mobile device is connected to a current limited power source, the current supply limit may present a problem when the battery of the mobile device is deeply depleted.

Under USB 2.0 standard specification, a USB device may initially draw 100 mA of supply current at 4.4V from an upstream self-powered USB port. A high-power USB device may increase the supply current draw to 500 mA after enumeration. Therefore, a high-power USB device must be powered up first in order to negotiate the higher current supply from the upstream power source.

The USB 2.0 specification also imposes a limit on the inrush current when the USB device is first connected. Inrush current refers to the current used to charge the input capacitance of the USB device. The inrush current limit prevents any current surge from pulling down the voltage on the USB power bus to below the minimum operating level. Meanwhile, the USB specification requires a connected USB device to present a load to the upstream USB host or hub of a minimum of 1 µF and a maximum of 10 µF in parallel with 44Ω. The inrush current limit is typically around 50 µC (micro-Coulomb).

The USB specification on supply current and inrush current becomes difficult to meet when recharging a mobile device having a deeply depleted battery. In particular, a high-power USB device, such as a smartphone, must first boot up in order to negotiate to the higher supply current limit of 500 mA. At a minimum, the processor and the memory of the USB device need to be powered up in order to start a USB session to request the high current limit. Therefore, in the case where the battery of the USB device is deeply depleted or is missing, the USB device is limited to 100 mA of supply current during the initial boot-up and until enough power is supplied to power up the processor and the memory of the USB device.

However, today's mobile devices often incorporate processors that are very powerful and power-hungry. The processors used in today's mobile devices often require more than 100 mA of supply current to boot-up. Thus, a mobile device with a deeply depleted battery often does not receive enough power in order to boot up the processor so as to negotiate to a higher current. Instead, conventional operation often hold off the boot-up of the mobile device until the battery is recharged to a certain level, such as 20%, using the 100 mA supply current. However, the time to charge up the battery even to the 20% level can take several minutes. This lag time to boot-up creates unsatisfactory user experience.

SUMMARY OF THE INVENTION

According to one embodiment of the present invention, a method for controlling a system voltage generated by a battery charger circuit in a battery-operated electronic device where the battery charger circuit generates the system voltage to supply circuitry of the electronic device and generates a battery voltage for recharging a battery of the electronic device includes: connecting the battery charger circuit to an input power source; accessing an available current supplied by the input power source; accessing a battery voltage of the battery; determining if the input power source is current limited based on the available current; determining if the battery is deeply depleted or missing based on the battery voltage; electrically isolating the system voltage from the battery voltage; and setting the system voltage to an elevated voltage value greater than a nominal battery voltage value.

The present invention is better understood upon consideration of the detailed description below and the accompanying drawings.

DETAILED DESCRIPTION OF THE PREFERRED EMBODIMENTS

In accordance with the principles of the present invention, a switching battery charger circuit implements a battery charger voltage control method to dynamically adjust the value of the system voltage based on the operating conditions of the input power source and the battery. The battery charger voltage control method operates to ensure that sufficient power is supplied to power up the circuitry of the electronic device in which the charger circuit is incorporated. In particular, in embodiments of the present invention, the battery charger voltage control method sets the system voltage to an elevated voltage value when the switching battery charger circuit is connected to a current-limited power source and the battery of the electronic device is deeply depleted or is missing. In this manner, the battery charger voltage control method enables a near instant boot-up of the electronic device, even under the operating conditions where the battery of the electronic device is deeply depleted or missing and the switching battery charger circuit can only receive power from a current-limited power source.

In embodiments of the present invention, the battery charger voltage control method is implemented in a switching battery charger circuit incorporated in a battery-powered or battery-operated electronic device. For example, the battery-operated electronic device may be a mobile device, such as a smartphone. The battery-operated electronic device may be powered and recharged through an unlimited power source, such as through an AC adaptor to an electrical outlet, or recharged through a current limited power source through a power bus. In some embodiments, the electronic device is powered and recharged using a Universal Serial Bus (USB) port. Other power bus systems for powering and recharging a battery-operated electronic device may also be used. In the present description, the battery-operated electronic device is sometimes referred to as a "USB device," or "a USB peripheral device". However, the use of a USB port as the power bus is illustrative only and is not intended to be limiting. The battery charger voltage control method can be applied in battery-operated electronic devices using any type of power bus architecture, presently known or to be developed.

Figure 1:
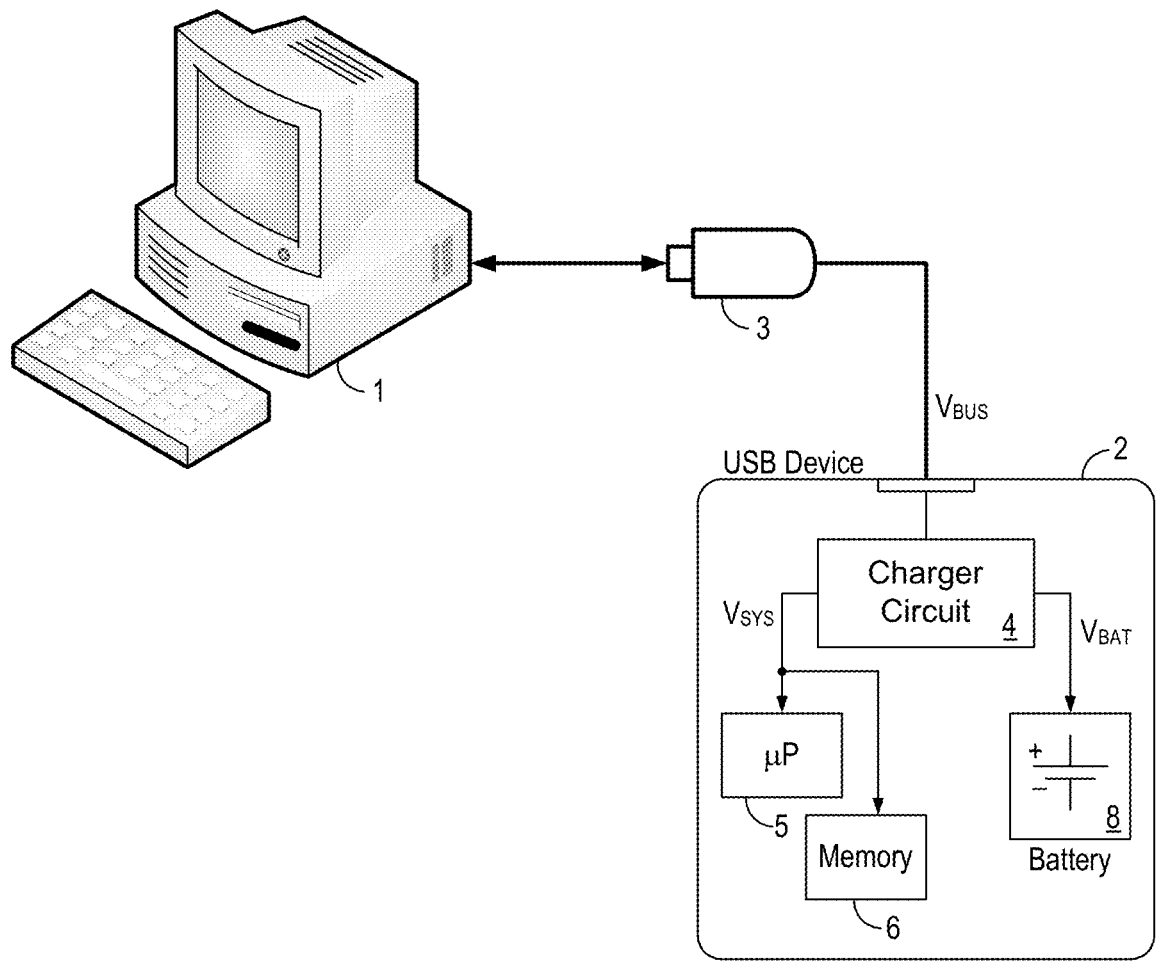
FIG. 1 illustrates a battery-operated electronic device in which the battery charger voltage control method can be implemented according to embodiments of the present invention.

FIG. 1 illustrates a battery-operated electronic device in which the battery charger voltage control method can be implemented according to embodiments of the present invention. Referring to FIG. 1, a battery-operated electronic device 2, also referred herein as a "USB device," is configured to receive power from a current-limited power source 1, such as a personal computer. In the present embodiment, the USB device 2 receives input power from an upstream power source through a USB port, represented by an USB connector 3.

The USB device 2 includes a battery charger circuit 4 which receives input power from the upstream power source 1 and generates output voltages for powering the internal circuitry of the USB device and for charging the battery of the USB device. More specifically, the battery charger circuit 4 generates a system voltage $V_{SYS}$ for powering the internal circuitry of the USB device, such as a microprocessor 5 and a memory 6. The battery charger circuit 4 further generates a battery voltage $V_{BAT}$ for recharging the battery 8.

In embodiments of the present invention, the battery charger circuit 4 is a switching power supply and receives a bus voltage $V_{BUS}$ on the USB port as the input voltage. The battery charger circuit 4 is sometimes referred to as a switching battery charger circuit. In embodiments of the present invention, the switching battery charger circuit 4 implements the battery charger voltage control method of the present invention to dynamically adjust the system voltage $V_{SYS}$ in order to provide additional energy storage and to maximize energy transfer from the input power source to the USB device, as will be described in more detail below.

Figure 2:
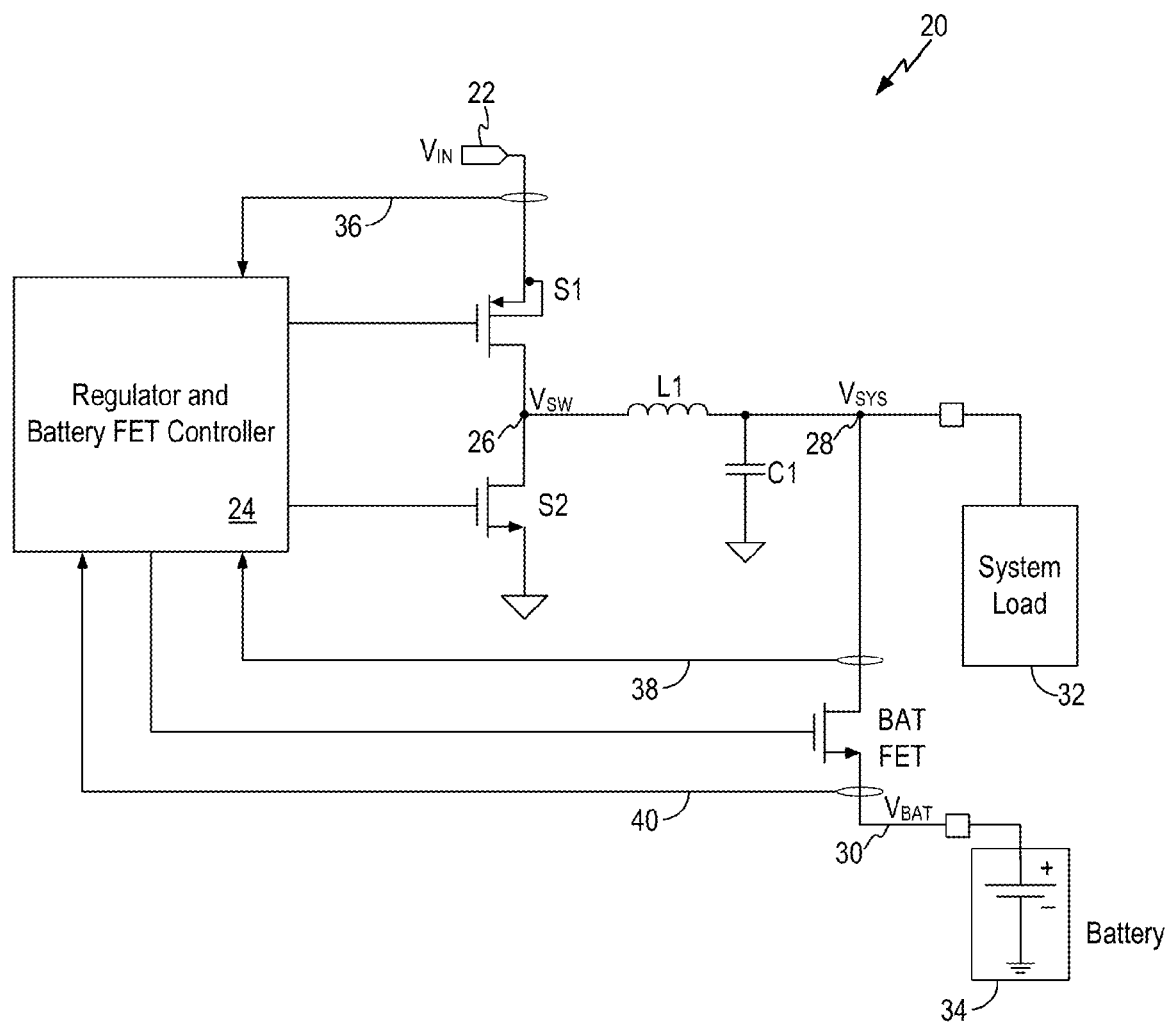
FIG. 2 is a schematic diagram of a switching battery charger circuit according to embodiments of the present invention.

FIG. 2 is a schematic diagram of a switching battery charger circuit according to embodiments of the present invention. Referring to FIG. 2, a switching battery charger circuit 20 includes a pair of power switches S1 and S2 connected in series to receive the input voltage $V_{IN}$ (node 22) and to generate a switching output voltage $V_{SW}$ (node 26). When the charger circuit 20 is connected to a current-limited power source, the input voltage $V_{IN}$ would be the bus voltage $V_{BUS}$ provided by the current-limited power source.

The switching output voltage $V_{SW}$ is coupled to an LC circuit including an inductor L1 and a capacitor C1 to generate an output voltage (node 28) having a substantially constant magnitude. In the present embodiment, the output voltage on node 28 is the system voltage $V_{SYS}$ for driving a system load 32. The system load 32 is the circuitry of the electronic device in which the charger circuit 20 is incorporated, such as a microprocessor and a memory. The system voltage $V_{SYS}$ is connected through a battery FET to the battery voltage node 30 providing a battery voltage $V_{BAT}$ to charge a battery 34. When the battery FET is turned on, node 28 is essentially shorted to node 30 so that the battery voltage $V_{BAT}$ is the same as the system voltage $V_{SYS}$. When the battery FET is turned off, the battery voltage node 30 is isolated from the system voltage node 28.

The switching charger circuit 20 includes a regulator and batter FET controller 24 for controlling the operation of the power switches and the battery FET. The controller 24 generates the control signals for driving power switches S1 and S2 and also the control signal for driving the battery FET. In operation, the controller 24 regulates the system voltage $V_{SYS}$ to a desired value based on the feedback voltage received on node 38. More specifically, the controller 24 adjusts the duty cycle of the switching output voltage $V_{SW}$ based on the feedback voltage on node 38 to regulate the system voltage $V_{SYS}$ (node 28) to the desired value. The controller 22 turns the battery FET on and off according to conventional practices well known in the art. For instance, the battery FET is open to isolate the battery 34 from the system voltage $V_{SYS}$ after the battery is fully charged, and the battery FET is closed to supplement the current supply to the system voltage node when the input power source cannot provide sufficient power.

In the present embodiment, the controller 24 also senses the input voltage (node 36) and the battery voltage (node 40). Accordingly to embodiments of the present invention, the controller 24 implements the battery charger voltage control method to dynamically adjust the voltage value of the system voltage based on the operating condition of the electronic device to maximize the power transfer to the system load 32 to allow the system load to boot up nearly instantly, even when the battery 34 may be deeply depleted. More specifically, the controller 24 controls the duty cycle of power switches S1 and S2 to adjust the voltage value of the system voltage $V_{SYS}$ and also control the battery FET to turn the battery FET on or off based on the operating conditions. The operating conditions are determined by sensing input voltage and sensing the battery voltage.

Figure 3:
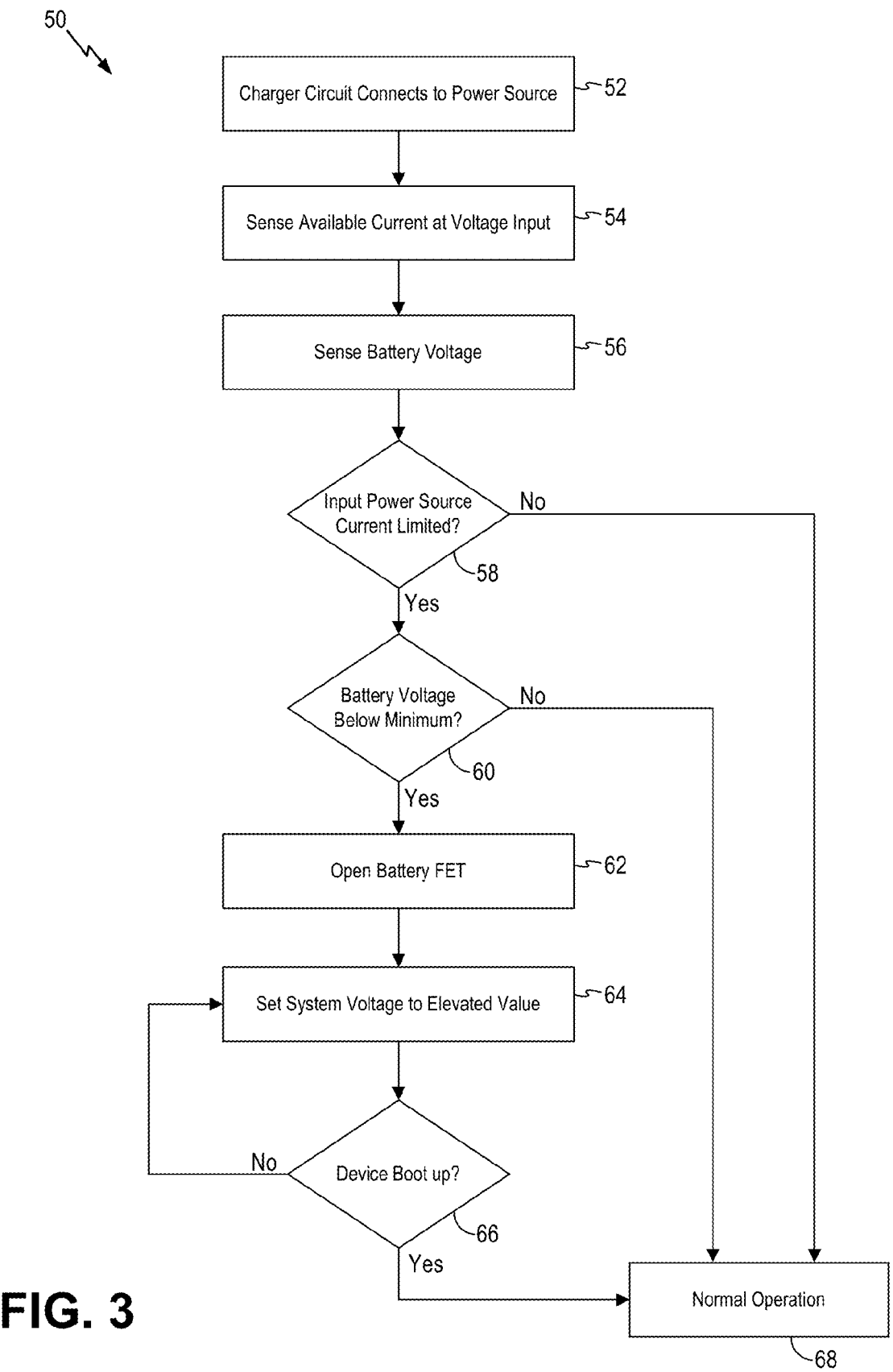
FIG. 3 is a flow chart illustrating the battery charger voltage control method according to one embodiment of the present invention.

FIG. 3 is a flow chart illustrating the battery charger voltage control method according to one embodiment of the present invention. In embodiments of the present invention, the battery charger voltage control method is implemented in the controller of a switching charger circuit, such as the switching charger circuit 20 of FIG. 2. Referring to FIG. 3, the battery charger voltage control method 50 starts when the charger circuit is connected to an input power source (step 52). The method senses the available current provided by the input power source (step 54). The method also senses the battery voltage at the battery (step 56). From the sensed available current, the method determines if the input power source is current-limited (step 58). If the input power source is not current limited, then the charger circuit may continue with normal operation in the conventional manner (step 68). If the input power source is current limited, the method continues to determine if the battery voltage is below a given minimum level indicating that the battery is deeply depleted (step 60). If the battery voltage is not below the given minimum level, then the charger circuit may continue with normal operation in the conventional manner (step 68).

However, if input power source is current limited and the battery voltage is below the minimum level, then the method proceeds to open or turn-off the battery FET (step 62). When the battery FET is open, the system voltage $V_{SYS}$ of the charger circuit is isolated from the battery voltage $V_{BAT}$ and the battery will not be recharged. Then, the method instructs the controller of the charger circuit to regulate the system voltage $V_{SYS}$ to an elevated voltage value (step 64). The elevated voltage value is maintained until the electronic device is boot up (step 66).

When the electric device has boot up, then the battery charger circuit can resume normal operation in the conventional manner (step 68). For instance, the control method 50 may close the battery FET to electrically short the system voltage to the battery voltage. The control method 50 may also proceed to regulate the system voltage to a value slightly above the battery voltage.

In the present description, an "elevated" system voltage refers to a system voltage value that is considerably greater than the nominal battery voltage. In conventional battery charger circuits, the system voltage is regulated to slightly above the nominal battery voltage. However, in accordance with the present invention, the system voltage is regulated to an elevated voltage value under certain operating conditions where the elevated voltage value is considerably or sizably greater than the nominal battery voltage. For instance, the nominal battery voltage for a Li-ion battery is 3.5V and conventional charger circuits regulate the system voltage to around 3.7V, being slightly greater than the Li-ion battery voltage. However, in embodiments of the present invention, when both of the operating conditions in the control method 50 are met, the battery voltage control method of the present invention regulates the system voltage to 4.5V, being a voltage considerably greater than the nominal battery voltage. In embodiments of the present invention, a voltage considerably greater than the nominal battery voltage refers to voltage values that are at least 1V greater than the nominal battery voltage.

In the battery charger voltage control method of the present invention, the battery charger circuit is configured to regulate to an elevated system voltage $V_{SYS}$ when two operating conditions are met—(1) when the input power source is determined to be current limited and (2) when the battery voltage is below a given minimum voltage value indicating a deeply depleted battery or a missing battery altogether. In the flow chart shown in FIG. 3, the sensing and comparison of the available current and battery voltage are illustrated as being performed in a given sequence. However, in actual practice, the sensing of the available current and the battery voltage can be carried out in any order or simultaneously. Similarly, the comparison of the available current and the battery voltage can be carried out in any order or simultaneously.

When the input power source is current limited and the battery is deeply depleted or missing, the battery charger voltage control method regulates the system voltage to an elevated level to provide an increase in the available energy from the capacitance on the output voltage node (node 28 in FIG. 2). That is, the elevated system voltage results in additional energy being stored on the output capacitor C1 to supply the current demand not met by the input power source. The increase in available energy supplies the inrush current needed to boot up the circuitry of the electronic device. In this manner, the electronic device may boot up almost instantly when the electronic device is connected to the power source.

In one embodiment, the battery charger voltage control method is applied in a battery-operated electronic device using an USB port to connect to an upstream current-limited power source. The battery of the electronic device is assumed to have a nominal battery voltage of 3.5V. When the electronic device with a battery that is deeply depleted or missing is connected to the upstream power source, the control method determines that the available current from the input power source is 100 mA only and therefore, the input power source is a current-limited power source. The control method further determines that the battery is deeply depleted or is missing because the battery voltage is less than the given minimum level, such as 3V. In that case, the control method opens the battery FET to isolate the system voltage from the battery voltage. Then the control method regulates the system voltage to an elevated voltage value. In one embodiment, the elevated system voltage is 4.5V when the nominal battery voltage is 3.5V. After the electronic device is boot up, the electronic device may then negotiate to the higher supply current of 500 mA and the control method regulates the system voltage in a conventional manner. For example, the system voltage may then be regulated to 3.7V, being a voltage slightly above the battery voltage of 3.5V.

The battery charger voltage control method of the present invention provides many advantages. First, the battery charger voltage control method regulates with system voltage to an elevated voltage value to maximize the energy transfer from a current limited power source to the electronic device without adding external components, thereby achieving lower total solution cost and smaller size.

Second, under the USB 2.0 standard, when the battery is deeply depleted or missing and the input power source is current-limited, the input power source can only provide 100 mA of current. However, an electronic device on start up may need more than 100 mA of current. That is, there may be spikes in the current demands during device boot up. If the device requires more than 100 mA to boot up, the current-limited input power source cannot supply the additional current and the boot up process is slowed down for conventional charger circuits. The user is not able to utilize the electronic device for a given time period due to the limiting current supply.

However, under the battery charger voltage control method of the present invention, the control method will regulate the system voltage to an elevated voltage value under these operating conditions so that more energy is stored on the output capacitor C1. The extra energy stored on the output capacitor C1 due to the elevated system voltage is used to supply the inrush current needed by the electronic device to boot up. In this manner, the electronic device boots up more quickly and the device may negotiate to the 500 mA supply current limit more quickly. Accordingly, the battery charger voltage control method realizes an almost instant boot-up of the electronic device, even when the device is connected to a current limited power source and the electronic device is completely battery depleted.

The above detailed descriptions are provided to illustrate specific embodiments of the present invention and are not intended to be limiting. Numerous modifications and variations within the scope of the present invention are possible. The present invention is defined by the appended claims.

We claim:

1. A method for controlling a system voltage generated by a battery charger circuit in a battery-operated electronic device, the battery charger circuit being configured to generate output voltages for powering the internal circuitry of the electronic device and for charging the battery of the electronic device, the method comprising:
- connecting the battery charger circuit to an input power source;
- generating, at the battery charger circuit, the system voltage at a system voltage node to supply internal circuitry of the electronic device and a battery voltage at a battery voltage node for recharging a battery of the electronic device;
- accessing an available current supplied by the input power source;
- accessing a battery voltage of the battery;
- determining whether the input power source is current limited based on the available current, wherein the input power source is current limited when the input power source is not derived from an AC power source;
- determining whether the battery is deeply depleted or missing based on the battery voltage;
- in response to the determining that the input power source is current limited and the determining that the battery is deeply depleted or missing, electrically isolating the battery voltage node from the system voltage node so that no voltage is provided to the battery and the battery is not being recharged, and further setting the system voltage to an elevated voltage value greater than a nominal battery voltage value; and
- supplying the elevated system voltage to the internal circuitry of the electronic device to boot up the electronic device.

2. The method of claim 1, wherein determining whether the input power source is current limited based on the available current comprises:
- determining that the input power source is current limited in response to the available current being equal to or less than a predetermined current value.

3. The method of claim 2, wherein determining that the input power source is current limited in response to the available current being equal to or less than a predetermined current value comprises:
- determining that the input power source is current limited in response to the available current being equal to 100 mA.

4. The method of claim 1, wherein determining whether the battery is deeply depleted or missing based on the battery voltage comprises:
- determining that the battery is deeply depleted or missing in response to the battery voltage being less than a predetermined voltage value.

5. The method of claim 4, wherein determining that the battery is deeply depleted or missing in response to the battery voltage being less than a predetermined voltage value comprises:
- determining that the battery is deeply depleted or missing in response to the battery voltage being less than 3V for a battery having a nominal battery voltage of 3.5V.

6. The method of claim 1, wherein electrically isolating the battery voltage node from the system voltage node comprises:
- turning off a transistor connecting the system voltage node to the battery voltage node.

7. The method of claim 1, wherein setting the system voltage to an elevated voltage value greater than a nominal battery voltage value comprises:
- setting the system voltage to a voltage value at least 1V greater than the nominal battery voltage value.

8. The method of claim 1, wherein the nominal battery voltage value is 3.5V and the elevated voltage value for the system voltage is 4.5V.

9. The method of claim 1, further comprising:
- determining whether the electronic device has boot up; and
- in response to the electronic device having boot up, regulating, at the battery charger circuit, the system voltage based on the battery voltage.

10. The method of claim 9, wherein regulating, at the battery charger circuit, the system voltage based on the battery voltage comprises regulating, at the battery charger circuit, the system voltage to be greater than the battery voltage by a small amount.

11. The method of claim 1, wherein the battery charger circuit comprises a switching battery charger circuit, the switching battery charger circuit including a pair of power switches being turned on and off at a given duty cycle to regulate the system voltage.

12. The method of claim 11, wherein setting the system voltage to an elevated voltage value greater than a nominal battery voltage value comprising:
- adjusting the duty cycle of the pair of power switches to regulate the system voltage to the elevated voltage value.

* * * * *